US012701510B2

(12) United States Patent
Zhang et al.

(10) Patent No.: US 12,701,510 B2
(45) Date of Patent: Aug. 4, 2026

(54) METHODS AND APPARATUSES FOR POWER SAVING IN DISCONTINUOUS RECEPTION

(71) Applicant: Lenovo (Beijing) Limited, Beijing (CN)

(72) Inventors: Yuantao Zhang, Beijing (CN); Hongmei Liu, Beijing (CN); Zhi Yan, Beijing (CN); Yingying Li, Beijing (CN); Haiming Wang, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 305 days.

(21) Appl. No.: 18/549,979

(22) PCT Filed: Mar. 12, 2021

(86) PCT No.: PCT/CN2021/080449
§ 371 (c)(1),
(2) Date: Sep. 11, 2023

(87) PCT Pub. No.: WO2022/188148
PCT Pub. Date: Sep. 15, 2022

(65) Prior Publication Data
US 2024/0155493 A1      May 9, 2024

(51) Int. Cl.
*H04W 52/02* (2009.01)
*H04L 5/00* (2006.01)
(Continued)

(52) U.S. Cl.
CPC ....... *H04W 52/0229* (2013.01); *H04L 5/0053* (2013.01); *H04W 72/232* (2023.01); *H04W 76/28* (2018.02)

(58) Field of Classification Search
CPC ........... H04W 52/0229; H04W 72/232; H04W 76/28; H04L 5/0016; H04L 5/0053; H04L 5/0064; H04L 5/0091; Y02D 30/70
See application file for complete search history.

(56) References Cited

U.S. PATENT DOCUMENTS

2020/0314811 A1    10/2020  Lin et al.
2020/0389874 A1    12/2020  Lin et al.
(Continued)

FOREIGN PATENT DOCUMENTS

CN        111385892  A      7/2020
GB          2597807  A      2/2022
(Continued)

OTHER PUBLICATIONS 21929623.3 , "Extended European Search Report", EP Application No. 21929623.3, Oct. 31, 2024, 9 pages.
(Continued)

*Primary Examiner* — Michael K Phillips
(74) *Attorney, Agent, or Firm* — FIG. 1 Patents

(57) ABSTRACT

Embodiments of the present application relate to methods and apparatuses for discontinuous reception (DRX). According to an embodiment of the present application, a method may include: receiving configuration information for a plurality of search space sets (SSSs); in the case that one or more SSSs of the plurality of SSSs are associated with at least one SSS group (SSSG), determining at least one SSS from each SSSG; in the case that the plurality of SSSs include a set of SSSs outside any SSSG, determining at least one SSS from the set of SSSs; and detecting downlink control information (DCI) in a determined SSS, wherein the DCI includes a field indicating a power saving operation for physical downlink control channel (PDCCH) monitoring. Embodiments of the present application can efficiently indi-
(Continued)

cate a power saving operation for PDCCH monitoring during the DRX active time.

20 Claims, 5 Drawing Sheets

(51) Int. Cl.
    *H04W 72/232*         (2023.01)
    *H04W 76/28*          (2018.01)

(56) References Cited

U.S. PATENT DOCUMENTS

| | | | |
|---|---|---|---|
| 2021/0007066 A1* | 1/2021 | Lin | H04L 1/0061 |
| 2021/0058970 A1 | 2/2021 | Kwak et al. | |
| 2021/0136771 A1* | 5/2021 | Xu | H04W 72/0453 |
| 2022/0053470 A1* | 2/2022 | Chen | H04L 1/0061 |
| 2022/0150946 A1* | 5/2022 | Tsai | H04W 76/28 |
| 2023/0180249 A1* | 6/2023 | Bala | H04W 52/028 |
| | | | 370/329 |
| 2023/0269742 A1* | 8/2023 | Kuang | H04W 72/1263 |
| | | | 370/329 |
| 2023/0319830 A1* | 10/2023 | Liang | H04L 5/0092 |
| | | | 370/329 |
| 2024/0072973 A1* | 2/2024 | Niu | H04L 5/0053 |

FOREIGN PATENT DOCUMENTS

| | | | |
|---|---|---|---|
| WO | 2020102146 A2 | 5/2020 | |
| WO | 2020246858 A1 | 12/2020 | |

OTHER PUBLICATIONS

Qualcomm Incorporated , "DCI-based power saving adaptation during DRX Active Time", 3GPP TSG-RAN WG1 #104-e, R1-2101476, e-Meeting, Jan. 2021, 4 pages.

Ericsson , "UE power saving using search space set switching", 3GPP TSG RAN WG1 #101-e, R1-2004360, e-Meeting [retrieved Aug. 10, 2023]. Retrieved from the Internet <https://www.3gpp.org/ftp/tsg_ran/WG1_RL1/TSGR1_101-e/Docs>., Jun. 2020, 6 Pages.

LG Electronics , "Discussion on PDCCH-based power saving signal/channel", 3GPP TSG RAN WG1 Meeting #97, R1-1906695, Reno, USA [retrieved Aug. 10, 2023]. Retrieved from the Internet <https://www.3gpp.org/ftp/tsg_ran/WG1_RL1/TSGR1_97/Docs>., May 2019, 6 Pages.

PCT/CN2021/080449 , "International Preliminary Report on Patentability", PCT Application No. PCT/CN2021/080449, Sep. 21, 2023, 6 pages.

PCT/CN2021/080449 , "International Search Report and Written Opinion", PCT Application No. PCT/CN2021/080449, Nov. 26, 2021, 7 pages.

Foreign Office Action issued in 202180093761.4, mailed Apr. 11, 2026, 20 pages.

* cited by examiner

900

METHODS AND APPARATUSES FOR POWER SAVING IN DISCONTINUOUS RECEPTION

TECHNICAL FIELD

Embodiments of the present application generally relate to wireless communication technologies, and especially to methods and apparatuses for power saving in discontinuous reception (DRX).

BACKGROUND

For a user equipment (UE) in a radio resource control (RRC)_CONNECTED state, a network may configure discontinuous reception (DRX) for power saving at the UE side. When DRX is configured, the UE does not need to continuously monitor physical downlink control channel (PDCCH) but waits for an on-duration time period of the DRX cycle and then wakes up to monitor the PDCCH.

If a PDCCH is detected during the on-duration time period of the DRX cycle, the UE will (re-)start a DRX-inactivity timer. The UE is in DRX active time and detects PDCCH when the DRX-inactivity timer is running. When the DRX-inactivity timer expires, the UE stops the PDCCH monitoring and goes to sleep mode.

To further reduce power consumption, it is expected to reduce unnecessary PDCCH monitoring during the DRX active time while keeping data scheduling with low latency. To fulfil that, the PDCCH monitoring should be adapted to the traffic status as much as possible during the DRX active time.

Given the above, the industry desires an improved technology for power saving in DRX, which can efficiently indicate a power saving operation for PDCCH monitoring during the DRX active time, so as to further reduce power consumption during the DRX active time.

SUMMARY OF THE DISCLOSURE

Embodiments of the present application at least provide a technical solution for DRX, which can further reduce power consumption during the DRX active time.

According to some embodiments of the present application, a method may include: receiving configuration information for a plurality of search space sets (SSSs); in the case that one or more SSSs of the plurality of SSSs are associated with at least one SSS group (SSSG), determining at least one SSS from each SSSG; in the case that the plurality of SSSs include a set of SSSs outside any SSSG, determining at least one SSS from the set of SSSs; and detecting downlink control information (DCI) in a determined SSS, wherein the DCI includes a field indicating a power saving operation for PDCCH monitoring.

In some embodiments, determining the at least one SSS from each SSSG includes determining an SSS with a highest priority in the SSSG; and/or determining the at least one SSS from the set of SSSs includes determining an SSS with a highest priority in the set of SSSs.

In an embodiment, the priority of each SSS is determined based on a DCI format associated with the SSS.

In another embodiment, a UE specific search space set (USS) with a lower index in an SSSG has a higher priority than that of a USS with a higher index in the SSSG; and/or a USS with a lower index in the set of SSSs has a higher priority than that of a USS with a higher index in the set of SSSs.

In yet another embodiment, a UE specific USS in an SSSG has a higher priority than that of a common search space set (CSS) in the SSSG; and/or a USS in the set of SSSs has a higher priority than that of a CSS in the set of SSSs.

In yet another embodiment, an SSS with a lower PDCCH monitoring periodicity in an SSSG has a higher priority than that of an SSS with a higher PDCCH monitoring periodicity in the SSSG; and/or an SSS with a lower PDCCH monitoring periodicity in the set of SSSs has a higher priority than that of an SSS with a higher PDCCH monitoring periodicity in the set of SSSs.

In some embodiments, determining the at least one SSS from each SSSG includes determining the at least one SSS from each SSSG based on a configuration received from a base station.

In some embodiments, determining the at least one SSS from the set of SSSs includes determining the at least one SSS from the set of SSSs based on a configuration received from a base station.

In an embodiment, the configuration indicates at least one SSS separately for each SSSG.

In another embodiment, determining the at least one SSS from each SSSG includes: determining a first SSS from a first SSSG based on the configuration; and determining a second SSS from a second SSSG, wherein the first SSS and the second SSS has at least one common property.

In yet another embodiment, the second SSS has the same DCI format and is associated with the same control resource set (CORESET) as the first SSS.

In some embodiments, the power saving operation for PDCCH monitoring includes a PDCCH skipping scheme or an SSSG switching scheme.

In an embodiment, the DCI detected in an SSS determined from the set of SSSs includes the field for indicating the PDCCH skipping scheme.

In another embodiment, the DCI detected in an SSS determined from an SSSG includes the field for indicating the SSSG switching scheme.

In yet another embodiment, whether the DCI detected in the determined SSS indicates the PDCCH skipping scheme or the SSSG switching scheme is configured by a base station (BS).

In yet another embodiment, in the case that the field indicates the PDCCH skipping scheme, a number of bits in the field is determined by a number of candidate PDCCH skipping durations.

In yet another embodiment, in the case that the field indicates the SSSG switching scheme, a number of bits in the field is determined by a number of the at least one SSSG.

In yet another embodiment, a number of bits in the field is a higher one of a first number of bits determined based on a number of candidate PDCCH skipping durations and a second number of bits determined based on a number of the at least one SSSG.

In yet another embodiment, in the case that two SSSGs in the at least one SSSG are activated, when the DCI is detected in an SSS determined from one SSSG of the two SSSGs, the field in the DCI indicates the PDCCH skipping scheme, and when the DCI is detected in an SSS determined from the other SSSG of the two SSSGs, the field in the DCI indicates the SSSG switching scheme.

In yet another embodiment, the one SSSG is a default SSSG.

In yet another embodiment, in the case that the detected DCI indicates PDCCH skipping for a duration, each SSSG that is activated before the PDCCH skipping becomes activated after an end of the duration or at least one default SSSG becomes activated after the end of the duration.

In yet another embodiment, in the case that the detected DCI indicates PDCCH skipping for a duration and at least one PDCCH monitoring occasion of a CSS is within the duration, the method includes performing one of: skipping detecting the CSS in the at least one PDCCH monitoring occasion; detecting the CSS in the at least one PDCCH monitoring occasion; or determining whether to detect the CSS in the at least one PDCCH monitoring occasion or not based on a configuration from a BS.

According to some embodiments of the present application, a method may include: transmitting configuration information for a plurality of SSSs; in the case that one or more SSSs of the plurality of SSSs are associated with at least one SSSG, determining at least one SSS from each SSSG; in the case that the plurality of SSSs include a set of SSSs outside any SSSG, determining at least one SSS from the set of SSSs; determining a power saving operation for PDCCH monitoring; and transmitting DCI in a determined SSS, wherein the DCI includes a field indicating the power saving operation for PDCCH monitoring.

In some embodiments, determining the at least one SSS from each SSSG includes determining an SSS with a highest priority in the SSSG; and/or determining the at least one SSS from the set of SSSs includes determining an SSS with a highest priority in the set of SSSs.

In an embodiment, the priority of each SSS is determined based on a DCI format associated with the SSS.

In another embodiment, a USS with a lower index in an SSSG has a higher priority than that of a USS with a higher index in the SSSG; and/or a USS with a lower index in the set of SSSs has a higher priority than that of a USS with a higher index in the set of SSSs.

In yet another embodiment, a UE specific USS in an SSSG has a higher priority than that of a CSS in the SSSG; and/or a USS in the set of SSSs has a higher priority than that of a CSS in the set of SSSs.

In yet another embodiment, an SSS with a lower PDCCH monitoring periodicity in an SSSG has a higher priority than that of an SSS with a higher PDCCH monitoring periodicity in the SSSG; and/or an SSS with a lower PDCCH monitoring periodicity in the set of SSSs has a higher priority than that of an SSS with a higher PDCCH monitoring periodicity in the set of SSSs.

In some embodiments, the method includes transmitting a configuration to indicate the at least one SSS determined from each SSSG In some embodiments, the method includes transmitting a configuration to indicate the at least one SSS determined from the set of SSSs.

In an embodiment, the configuration indicates at least one SSS separately for each SSSG.

In another embodiment, the configuration indicates a first SSS determined from a first SSSG, and the first SSS and a second SSS determined from a second SSSG has at least one common property.

In yet another embodiment, the second SSS has the same DCI format and is associated with the same CORESET as the first SSS.

In some embodiments, the power saving operation for PDCCH monitoring includes a PDCCH skipping scheme or an SSSG switching scheme.

In an embodiment, the DCI transmitted in an SSS determined from the set of SSSs includes the field for indicating the PDCCH skipping scheme.

In another embodiment, the DCI transmitted in an SSS determined from an SSSG includes the field for indicating the SSSG switching scheme.

In yet another embodiment, the method includes transmitting a configuration to indicate whether the DCI in the determined SSS indicates the PDCCH skipping scheme or the SSSG switching scheme.

In yet another embodiment, in the case that the field indicates the PDCCH skipping scheme, a number of bits in the field is determined by a number of candidate PDCCH skipping durations.

In yet another embodiment, in the case that the field indicates the SSSG switching scheme, a number of bits in the field is determined by a number of the at least one SSSG.

In yet another embodiment, a number of bits in the field is a higher one of a first number of bits determined based on a number of candidate PDCCH skipping durations and a second number of bits determined based on a number of the at least one SSSG.

In yet another embodiment, in the case that two SSSGs in the at least one SSSG are activated, when the DCI is transmitted in an SSS determined from one SSSG of the two SSSGs, the field in the DCI indicates the PDCCH skipping scheme, and when the DCI is transmitted in an SSS determined from the other SSSG of the two SSSGs, the field in the DCI indicates the SSSG switching scheme.

Some embodiments of the present application provide an apparatus including: at least one non-transitory computer-readable medium having computer executable instructions stored therein; at least one receiving circuitry; at least one transmitting circuitry; and at least one processor coupled to the at least one non-transitory computer-readable medium, the at least one receiving circuitry and the at least one transmitting circuitry. The computer executable instructions are programmed to implement any method described in the present application with the at least one receiving circuitry, the at least one transmitting circuitry and the at least one processor.

BRIEF DESCRIPTION OF THE DRAWINGS

In order to describe the manner in which advantages and features of the application can be obtained, a description of the application is rendered by reference to specific embodiments thereof, which are illustrated in the appended drawings. These drawings depict only example embodiments of the application and are not therefore to be considered limiting of its scope.

DETAILED DESCRIPTION

The detailed description of the appended drawings is intended as a description of the currently preferred embodiments of the present application and is not intended to represent the only form in which the present application may be practiced. It is to be understood that the same or equivalent functions may be accomplished by different embodiments that are intended to be encompassed within the spirit and scope of the present application.

Reference will now be made in detail to some embodiments of the present application, examples of which are illustrated in the accompanying drawings. To facilitate understanding, embodiments are provided under specific network architecture and new service scenarios, such as 3rd generation partnership project (3GPP) 5G (i.e., new radio (NR)), 3GPP long term evolution (LTE) Release 8 and so on. Persons skilled in the art know very well that, with the development of network architecture and new service scenarios, the embodiments in the present application are also applicable to similar technical problems; and moreover, the terminologies recited in the present application may change, which should not affect the principle of the present application.

Figure 1:
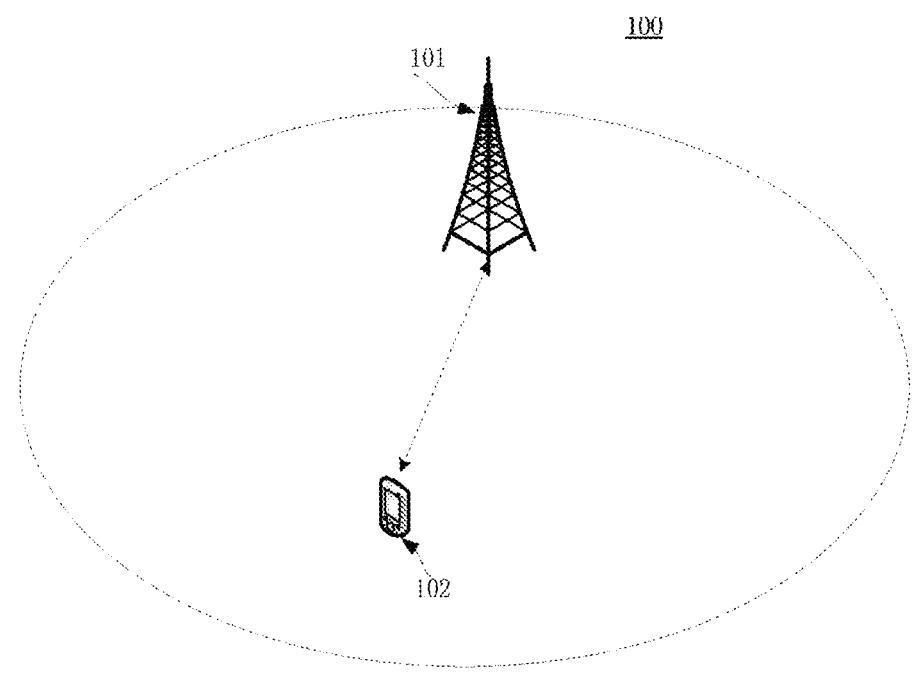
FIG. 1 is a schematic diagram illustrating an exemplary wireless communication system according to some embodiments of the present application.

FIG. 1 is a schematic diagram illustrating an exemplary wireless communication system 100 according to an embodiment of the present application.

As shown in FIG. 1, the wireless communication system 100 includes at least one BS 101 and at least one UE 102. In particular, the wireless communication system 100 includes one BS 101 and one UE 102 for illustrative purpose. Although a specific number of BS 101 and UE 102 are depicted in FIG. 1, it is contemplated that any number of BSs and UEs may be included in the wireless communication system 100.

The BS 101 may also be referred to as an access point, an access terminal, a base, a macro cell, a node-B, an enhanced nodeB (eNB), a gNB, a home node-B, a relay node, or a device, or described using other terminology used in the art. The BS 101 is generally part of a radio access network that may include a controller communicably coupled to the BS 101.

In some embodiments, the UE 102 may include a computing device, such as a desktop computer, a laptop computer, a personal digital assistant (PDA), a tablet computer, a smart television (e.g., a television connected to the Internet), a set-top box, a game console, a security system (including security cameras), a vehicle on-board computer, a network device (e.g., a router, a switch, and a modem), or the like. In some embodiments, the UE 102 may include a portable wireless communication device, a smart phone, a cellular telephone, a flip phone, a device having a subscriber identity module, a personal computer, a selective call receiver, or any other device that is capable of sending and receiving communication signals on a wireless network. In some embodiments, the UE 102 may include a wearable device, such as a smart watch, a fitness band, an optical head-mounted display, or the like. Moreover, the UE 102 may be referred to as a subscriber unit, a mobile, a mobile station, a user, a terminal, a mobile terminal, a wireless terminal, a fixed terminal, a subscriber station, a user terminal, or a device, or described using other terminology used in the art.

The wireless communication system 100 is compatible with any type of network that is capable of sending and receiving wireless communication signals. For example, the wireless communication system 100 is compatible with a wireless communication network, a cellular telephone network, a time division multiple access (TDMA)-based network, a code division multiple access (CDMA)-based network, an orthogonal frequency division multiple access (OFDMA)-based network, an LTE network, a 3GPP-based network, a 3GPP 5G network, a satellite communications network, a high altitude platform network, and/or other communications networks.

For a UE in an RRC_CONNECTED state, the network may configure DRX for power saving at the UE side. The basic mechanism of DRX is to configure a DRX cycle for the UE in the RRC_CONNECTED state.

Figure 2:
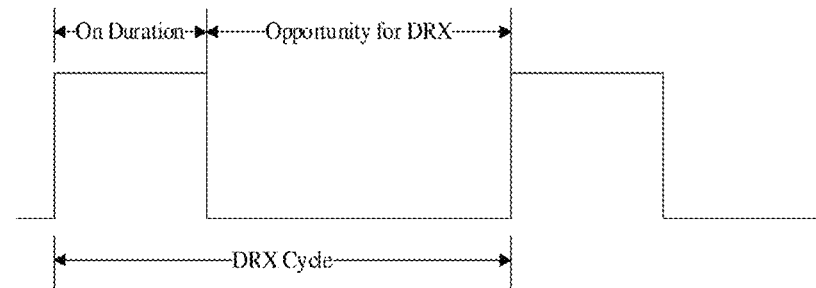
FIG. 2 illustrates an example of DRX cycle according to some embodiments of the present application.

FIG. 2 illustrates an example of DRX cycle according to some embodiments of the present application.

Referring to FIG. 2, in the time domain, the time is divided into the continuous DRX cycles. A DRX cycle may include an "on-duration" time period and an "opportunity for DRX" time period. When DRX is configured, the UE does not need to continuously monitor physical downlink control channel (PDCCH) but waits for an "on-duration" time period of the DRX cycle and then wakes up to monitor PDCCH. During the "opportunity for DRX" time period, the UE does not monitor PDCCH to save power.

If a PDCCH is detected during the "on-duration" time period of the DRX cycle, the UE may (re-)start a DRX-inactivity timer. The UE is in DRX active time and detects PDCCH when the DRX-inactivity timer is running. When the DRX-inactivity timer expires, the UE stops the PDCCH monitoring and goes to sleep mode.

To further reduce the power consumption at the UE side, it is expected to reduce unnecessary PDCCH monitoring during the DRX active time while keeping data scheduling with low latency. To fulfil that, the PDCCH monitoring should be adapted to the traffic status as much as possible during the DRX active time. For example, the UE may spend more effort on PDCCH monitoring when data arrives. Before or after that, the UE may spend less effort on PDCCH monitoring for power saving.

Two candidate schemes for power saving may be used to reduce the unnecessary PDCCH monitoring during the DRX active time. One is a PDCCH skipping scheme and the other is an SSSG switching scheme.

Figure 3:
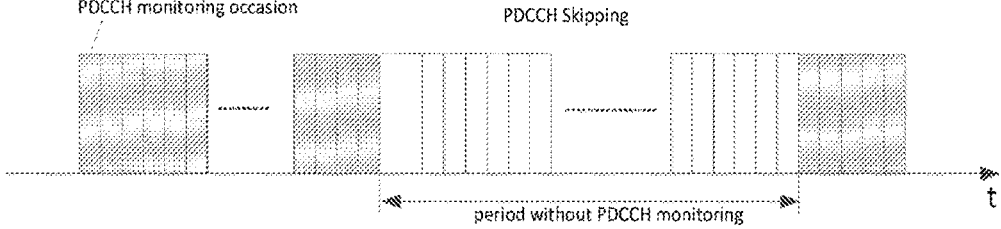
FIG. 3 illustrates an example of PDCCH skipping scheme according to some embodiments of the present application.

In the PDCCH skipping scheme, PDCCH monitoring can be dynamically skipped for a duration when there is no traffic arrives. FIG. 3 illustrates an example of PDCCH skipping scheme according to some embodiments of the present application. Referring to FIG. 3, PDCCH is monitored in the configured PDCCH monitoring occasions when there are data packets waiting for the scheduling. After the data transmission, PDCCH monitoring is skipped for a period (i.e., a period without PDCCH monitoring).

When a UE is configured with one or more SSSs, it may monitor PDCCH in the configured one or more SSSs in corresponding PDCCH monitoring occasions. The PDCCH may carry DCI which is used for downlink (DL) data scheduling, uplink (UL) data scheduling, slot format indication, and so on.

There are two types of SSSs, i.e., common search space sets (CSS) and UE specific search space sets (USS). The former is mostly shared by UEs and may be configured either in system information or UE specific signalling, while the latter may be configured for each UE separately. A UE may be configured with up to 10 SSSs in a bandwidth part. The 10 SSSs may include one or more CSSs and/or one or more USSs.

A search space set is configured to be associated with a control resource set (CORESET), which defines the time (i.e., the number of OFDM symbols) and frequency resources for PDCCH monitoring. The parameters for an SSS may be configured in SearchSpace information element (IE) as specified in 3GPP standard documents. For example, Table 1 shows some relevant configuration fields and the associated descriptions included in an SSS configuration.

TABLE 1

| Relevant fields in an SSS configuration | |
| --- | --- |
| Configuration fields | Descriptions |
| searchSpaceId | Search space set ID |
| controlResourceSetId | Associated CORESET ID |
| monitoringSlotPeriodicityAndOffset | Slots for PDCCH Monitoring configured as periodicity and offset |
| duration | Number of consecutive slots in each PDCCH monitoring periodicity |
| monitoringSymbolsWithinSlot | Starting OFDM symbols for PDCCH monitoring in the slots configured for PDCCH monitoring |
| nrofCandidates | Number of candidates per aggregation level (0, 1, 2, 3, 4, 5, 6, 8) |
| searchSpaceType | Indicates whether this is a common search space or a UE specific search space |

Referring to Table 1, the value of the parameter searchSpaceId may be an identifier (ID) of the SSS. The value of the parameter controlResourceSetId may be an ID of the CORESET associated with the SSS. The value of the parameter monitoringSlotPeriodicityAndOffset may indicate a PDCCH monitoring periodicity and offset, which is in terms of slots. The value of the parameter duration may indicate a number of consecutive slots in each PDCCH monitoring periodicity. The value of the parameter monitoringSymbolsWithinSlot may indicate starting OFDM symbols for PDCCH monitoring in the slots configured for PDCCH monitoring. The value of the parameter nrofCandidates may indicate aggregation levels in the search space set and the number of candidates for each aggregation level. The number of candidates for each aggregation level may be 0, 1, 2, 3, 4, 5, 6, or 8. The value of the parameter searchSpaceType may indicate whether the SSS is a CSS or a USS.

In the SSSG switching scheme, one SSSG with high PDCCH monitoring effort (e.g., with low PDCCH monitoring periodicity) may be activated when there are high data volumes, while the UE may switch to another SSSG with low PDCCH monitoring effort (e.g., with high PDCCH monitoring periodicity) when there is no data volume or low data volume for power saving.

Depending on the BS's configuration, an SSSG may include one or more SSSs, and one SSS may be included in (or associated with) one or more SSSGs. When an SSSG is activated, the UE may monitor PDCCH in the configured one or more SSSs in the SSSG.

Figure 4:
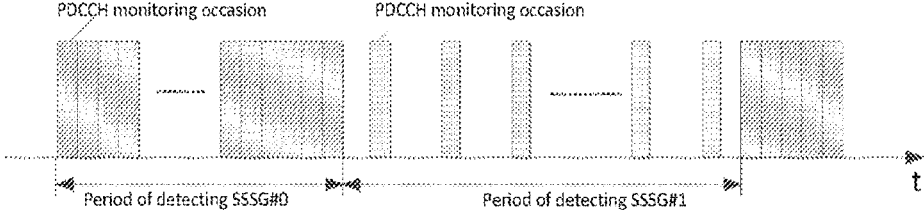
FIG. 4 illustrates an example of SSSG switching scheme according to some embodiments of the present application.

FIG. 4 illustrates an example of SSSG switching scheme according to some embodiments of the present application. Referring to FIG. 4, assuming that SSSG #0 with low PDCCH monitoring periodicity and SSSG #1 with high PDCCH monitoring periodicity are configured, the UE may first monitor PDCCH in SSSG #0 and then switch to SSSG #1 for power saving. That is, in the example as shown in FIG. 4, SSSG #0 is activated in the period of detecting SSSG #0, and SSSG #1 is activated in the period of detecting SSSG #1.

Since the two schemes, i.e., the PDCCH skipping scheme and the SSSG switching scheme, may both be used for PDCCH monitoring in the DRX active time, it is beneficial to strive for a common design for PDCCH monitoring adaptation in DRX active time, so as to support functionalities inclusive of both the PDCCH skipping scheme and the SSSG switching scheme.

Given the above, embodiments of the present application may provide technical solutions for DRX, which can efficiently indicate a power saving operation (e.g., the PDCCH skipping scheme or the SSSG switching scheme) for PDCCH monitoring during the DRX active time, so as to further reduce power consumption during the DRX active time. More details on embodiments of the present application will be described in the following text in combination with the appended drawings.

Figure 5:
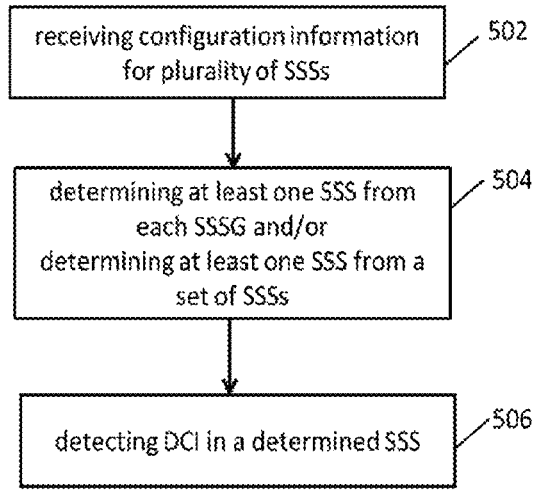
FIG. 5 is a flow chart illustrating an exemplary method for DRX according to some embodiments of the present application.

FIG. 5 is a flow chart illustrating an exemplary procedure of a method for DRX according to some embodiments of the present application. The method may be performed by a UE, for example, the UE 102 as shown in FIG. 1.

In the exemplary method shown in FIG. 5, in step 502, the UE may receive configuration information for a plurality of SSSs from a BS (e.g., the BS 101 as shown in FIG. 1). In some embodiments, the configuration information may include configuration fields for each SSS, as listed in Table 1. Alternatively or additionally, for the plurality of SSSs, the BS may flexibly configure a number of SSSGs and a number of SSSs within an SSSG. For example, the configuration information may indicate whether an SSS of the plurality of SSSs is associated with one or more SSSGs. Consequently, there are three cases for the plurality of SSSs.

1) Case 1: no SSSG is configured, i.e., the plurality of SSSs are not associated with any SSSG.

2) Case 2: at least one SSSG is configured, and the plurality of SSSs may include one or more SSSs associated with the at least one SSSG and a set of SSSs outside any SSSG.

3) Case 3: at least one SSSG is configured, and the plurality of SSSs are all associated with the at least one SSSG and do not include SSS outside any SSSG.

Figure 6:
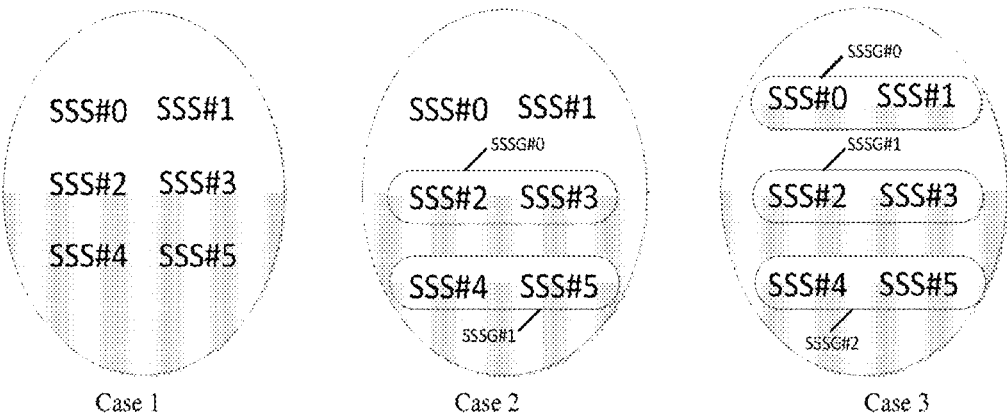
FIG. 6 illustrates examples of configurations of a plurality of SSSs according to some embodiments of the present application.

FIG. 6 illustrates examples of configurations of a plurality of SSSs according to some embodiments of the present application, in which the aforementioned three cases are shown.

Referring to FIG. 6, the UE may receive configuration information for a plurality of SSSs from a BS. The plurality of SSSs in FIG. 6 may include six SSSs, i.e., SSS #0, SSS #1, SSS #2, SSS #3, SSS #4, and SSS #5. In case 1, the six SSSs are not included in any SSSG, i.e., the six SSSs are not associated with any SSSG. In case 2, SSS #0 and SSS #1 are not included in any SSSG, SSS #2 and SSS #3 are configured to be associated with one SSSG (e.g., SSSG #0), and SSS #4 and SSS #5 are configured to be associated with another SSSG (e.g., SSSG #1). In case 3, SSS #0 and SSS #1 are configured to be associated with one SSSG (e.g., SSSG #0), SSS #2 and SSS #3 are configured to be associated with another SSSG (e.g., SSSG #1), and SSS #4 and SSS #5 are configured to be associated with yet another SSSG (e.g., SSSG #2). Whether an SSS is associated with an SSSG may be indicated by the configuration information received from the BS. Although a specific number of SSSs are depicted in FIG. 6, it is contemplated that the plurality of SSSs may include any number of SSSs. Although FIG. 6 shows that an SSS (e.g., SSS #2, SSS #3, SSS #4, or SSS #5 in case 2) is associated with only one SSSG, it is contemplated that an SSS may be associated with more than one SSSG in other embodiments of the present application. Although FIG. 6 shows that the plurality of SSSs start with index "#0" and contain SSSs with consecutive indices, it is contemplated that the plurality of SSSs may start with SSS index other than "#0", and/or may contain SSSs with nonconsecutive indices in some other embodiments. In addition, although FIG. 6 shows that each of the plurality of SSSs has different SSS index, it is contemplated that two or more SSSs may have same index but differentiated with the configured SSSG index in some other embodiments, i.e., the two or more SSSs having the same index may be associated with different SSSGs.

After receiving the configuration information for the plurality of SSSs, in step 504, the UE may determine at least one SSS from each SSSG and/or determine at least one SSS from a set of SSSs outside any SSSG, which may be used for power saving indication (i.e., used by the BS to transmit DCI indicating a power saving operation such as the PDCCH skipping scheme or the SSSG switching scheme). That is, in step 504, in the case that one or more SSSs of the plurality of SSSs are associated with at least one SSSG (i.e., case 2 or case 3), the UE may determine at least one SSS from each SSSG. In the case that the plurality of SSSs include a set of SSSs (including one or more SSSs) outside any SSSG (i.e., case 1 or case 2), the UE may determine at least one SSS from the set of SSSs.

Taking FIG. 6 as an example, after receiving configuration information for the six SSSs, in case 1, the UE may determine at least one SSS from the six SSSs, which constitute a set of SSSs outside any SSSG. In case 2, SSS #0 and SSS #1 constitute a set of SSSs outside any SSSG, and the UE may determine at least one SSS from SSS #0 and SSS #1, determine at least one SSS from SSSG #0, and determine at least one SSS from SSSG #1. In case 3, the UE may determine at least one SSS from SSSG #0, determine at least one SSS from SSSG #1, and determine at least one SSS from SSSG #2.

In some embodiments, determining the at least one SSS from each SSSG (e.g., in case 2 or case 3) may include determining an SSS with a highest priority in the SSSG. Determining the at least one SSS from the set of SSSs outside any SSSG (e.g., in case 1 or case 2) may include determining an SSS with a highest priority in the set of SSSs. Taking FIG. 6 as an example, in case 1, the UE may determine an SSS with a highest priority from the six SSSs.

In case 2, the UE may determine an SSS with a higher priority from SSS #0 and SSS #1 (i.e., the set of SSSs outside any SSSG), determine an SSS with a higher priority from SSS #2 and SSS #3 in SSSG #0, and determine an SSS with a higher priority from SSS #4 and SSS #5 in SSSG #1. In case 3, the UE may determine an SSS with a higher priority from SSS #0 and SSS #1 in SSSG #0, determine an SSS with a higher priority from SSS #2 and SSS #3 in SSSG #1, and determine an SSS with a higher priority from SSS #4 and SSS #5 in SSSG #2.

In an embodiment of the present application, for each SSSG and/or the set of SSSs outside any SSSG, the priority of each SSS can be determined based on a DCI format associated with the SSS. That is, the priority of an SSS with a specific DCI format is higher than that of another SSS with another specific DCI formats. For example, the priority of an SSS with DCI format 1_1 or 0_1 is higher than the priority of an SSS with DCI format 1_2 or 0_2, which is higher than the priority of an SSS with DC format 1_0 or 0_0.

In another embodiment of the present application, a USS with a lower index in an SSSG may have a higher priority than that of a USS with a higher index in the SSSG. Alternatively or additionally, a USS with a lower index in the set of SSSs outside any SSSG may have a higher priority than that of a USS with a higher index in the set of SSSs.

In yet another embodiment of the present application, a USS in an SSSG may have a higher priority than that of a CSS in the SSSG. Alternatively or additionally, a USS in the set of SSSs outside any SSSG may have a higher priority than that of a CSS in the set of SSSs.

In yet another embodiment of the present application, an SSS with a lower PDCCH monitoring periodicity in an SSSG may have a higher priority than that of an SSS with a higher PDCCH monitoring periodicity in the SSSG. Alternatively or additionally, an SSS with a lower PDCCH monitoring periodicity in the set of SSSs outside any SSSG may have a higher priority than that of an SSS with a higher PDCCH monitoring periodicity in the set of SSSs.

In some embodiments, determining the at least one SSS from each SSSG (e.g., in case 2 or case 3) may include determining the at least one SSS from each SSSG based on a configuration received from a base station. That is, the UE may receive a configuration from the BS. The configuration may indicate at least one SSS which may be used for power saving indication from each SSSG. The configuration may be included in the configuration information received in step 502 or may be separate from the configuration information received in step 502.

In an embodiment of the present application, the configuration may indicate at least one SSS separately for each SSSG. That is, for each SSSG, the configuration may explicitly indicate at least one SSS which may be used for power saving indication from the SSSG.

In another embodiment of the present application, the configuration may indicate an SSS for a specific SSSG, and the UE may determine at least one SSS which may be used for power saving indication from other SSSG(s) based on the indicated SSS. To distinguish the SSS and the specific SSSG indicated by the BS from other SSS(s) and SSSG(s), the indicated SSS for the specific SSSG may be referred to as the first SSS for the first SSSG. The terms "first SSS" and "first SSSG" are not used to limit the orders of the SSS and the specific SSSG indicated by the BS among the configured SSSs and SSSGs. In some embodiments of the present application, the first SSSG may be a default SSSG.

For example, after receiving the configuration indicating the first SSS for the first SSSG, the UE may determine the first SSS from the first SSSG based on the configuration. Then, the UE may determine a second SSS from a second SSSG. The first SSS and the second SSS may have at least one common property. In some embodiments, the common property may include the same DCI format, the same CORESET, or the like. For example, the second SSS may have the same DCI format and is associated with the same CORESET as the first SSS. Similarly, the terms "second SSS" and "second SSSG" are not used to limit the orders of the SSS and SSSG determined by the UE. The UE may determine at least one SSS from other SSSG(s) in the same way.

Taking case 3 in FIG. 6 as an example, it is assumed that the configuration from the BS indicates SSS #3 for SSSG #1, and SSS #1 in SSSG #0 and SSS #5 in SSSG #2 have the same DCI format and are associated with the same CORE-SET as SSS #3 in SSSG #1. After receiving the configuration from the BS, the UE may first determine SSS #3 from SSSG #1, and then determine SSS #1 from SSSG #0 and SSS #5 from SSSG #2.

In some embodiments, determining the at least one SSS from the set of SSSs outside any SSSG (e.g., in case 1 or case 2) includes determining the at least one SSS from the set of SSSs based on a configuration received from a base station. That is, the UE may receive a configuration from the BS. The configuration may indicate the at least one SSS which may be used for power saving indication from the set of SSSs. The configuration may be included in the configuration information received in step 502 or may be separate from the configuration information received in step 502.

After determining the at least one SSS from each SSSG (e.g., in case 2 or case 3) and/or determining the at least one SSS from the set of SSSs outside of any SSSG (e.g., in case 1 or case 2), the UE may monitor all the configured SSS(s) outside of any SSSG and the configured SSS(s) in activated SSSG(s). In step 506, the UE may detect DCI in an SSS determined in step 504. The DCI may include a field indicating a power saving operation for PDCCH monitoring. The power saving operation for PDCCH monitoring may include a PDCCH skipping scheme or an SSSG switching scheme.

In some embodiments, in the case that the DCI is detected in an SSS determined from the set of SSSs outside of any SSSG, the field indicating a power saving operation in the DCI may indicate the PDCCH skipping scheme. In the case that the DCI is detected in an SSS determined from an SSSG, the field indicating a power saving operation in the DCI may indicate the SSSG switching scheme.

In some embodiments, whether the DCI detected in the determined SSS indicates the PDCCH skipping scheme or the SSSG switching scheme may be configured by the BS.

In some embodiments, in the case that the field in the detected DCI indicates the PDCCH skipping scheme, a number of bits in the field may be determined by a number of candidate PDCCH skipping durations. In an embodiment, assuming that the number of candidate PDCCH skipping durations is M1 (M1 is an integer lager than 1), the number of bits in the field of the DCI may be ceil($\log_2$ M1). For example, assuming that the number of candidate PDCCH skipping durations is 7, the number of bits in the field may be 3.

In some embodiments, in the case that the field indicates the SSSG switching scheme, a number of bits in the field may be determined by a number of the at least one SSSG configured by the BS (determined based on the configuration information received in step 502). In an embodiment, assuming that the number of the at least one SSSG configured by the BS is M2 (M2 is an integer lager than 1), the number of bits in the field may be ceil($\log_2$ M2). For example, assuming that the number of the at least one SSSG configured by the BS is 7, the number of bits in the field may be 3.

In some embodiments, a number of bits in the field may be a higher one of a first number of bits determined based on a number of candidate PDCCH skipping durations and a second number of bits determined based on a number of the at least one SSSG configured by the BS. For example, assuming that the number of candidate PDCCH skipping durations (M1) is 8 and the first number of bits (N1) is ceil($\log_2$ M1)=3, and the number of the at least one SSSG configured by the BS (M2) is 9 and the second number of bits (N2) is ceil($\log_2$ M2)=4, the number of bits in the field may be a higher one of N1 and N2, i.e., 4.

In some embodiments, two SSSGs in the at least one SSSG configured by the BS may be activated simultaneously. In such cases, when the DCI including the field indicating the power saving operation is detected in an SSS determined from one SSSG of the two SSSGs, the field in the DCI may indicate the PDCCH skipping scheme; when the DCI including the field indicating the power saving operation is detected in an SSS determined from the other SSSG of the two SSSGs, the field in the DCI may indicate the SSSG switching scheme. In these embodiments, the number of bits in the field of the DCI may be determined based on the same rule as the above embodiments. In an embodiment, the one SSSG for indicating the PDCCH skipping scheme may be a default SSSG.

In some embodiment, in the case that the detected DCI indicates PDCCH skipping for a duration, each SSSG that is activated before the PDCCH skipping becomes activated after an end of the duration. For example, in the case that one SSSG is activated before the PDCCH skipping, after the end of the duration, the one SSSG becomes activated; in the case that two SSSGs are activated before the PDCCH skipping, after the end of the duration, the two SSSGs become activated. In some other embodiments, in the case that the detected DCI indicates PDCCH skipping for a duration, at least one default SSSG becomes activated after the end of the duration.

In some embodiment, in the case that the detected DCI indicates PDCCH skipping for a duration and at least one PDCCH monitoring occasion of a CSS is within the duration, the UE may skip detecting the CSS in the at least one PDCCH monitoring occasion. In some other embodiments, the UE may detect the CSS in the at least one PDCCH monitoring occasion anyway. In some other embodiments, the UE may determine whether to detect the CSS in the at least one PDCCH monitoring occasion or not based on a configuration from the BS. The configuration may be included in the configuration information received in step 502 or may be separate from the configuration information received in step 502. In an embodiment of the present application, the CSS may include at least one of: a type-0 CSS for scheduling system information as specified in 3GPP standard documents, a type-1 CSS for data scheduling in random access procedure as specified in 3GPP standard documents, and a type-2 CSS for paging scheduling as specified in 3GPP standard documents.

Figure 7:
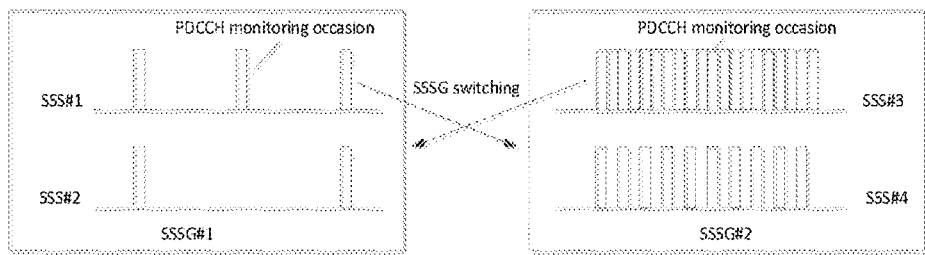
FIG. 7 illustrates an example of SSSG switching between two SSSGs according to some embodiments of the present application.

FIG. 7 illustrates an example of SSSG switching between two SSSGs according to some embodiments of the present application.

Referring to FIG. 7, it is assumed that the BS may configure the UE with at least two SSSGs, e.g., SSSG #1 and SSSG #2. SSSG #1 may include SSS #1 and SSS #2. SSSG #2 may include SSS #3 and SSS #4.

Based on the above embodiments, the UE may determine SSS #1 in SSSG #1 and SSS #3 in SSSG #2 which may be used for power saving indication, e.g., they may be determined implicitly based on the priority of SSSs in each SSSG, or may be determined based on the configuration from the BS.

In some cases, when SSSG #1 is activated, the UE may monitor PDCCH in PDCCH monitoring occasions configured for SSS #1 and SSS #2 in SSSG #1, and detect DCI in SSS #1 for power saving indication, i.e., the UE detects DCI in SSS #1 in SSSG #1, wherein the DCI has a field indicting an SSSG switching scheme. The field may have 1 bit, with the value "0" indicating not performing SSSG switching or value "1" indicating switching to SSSG #2.

In some cases, when SSSG #2 is activated, the UE may monitor PDCCH in PDCCH monitoring occasions configured for SSS #3 and SSS #4 in SSSG #2, and detect DCI in SSS #3 for power saving indication, i.e., the UE detects DCI in SSS #3 in SSSG #2, wherein the DCI has a field indicting an SSSG switching scheme. The field may have 1 bit, with the value "0" indicating not performing SSSG switching or value "1" indicating switching to SSSG #1.

In the example of FIG. 7, the DCI in SSS #2 and SSS #4 do not have the field for power saving indication.

Figure 8:
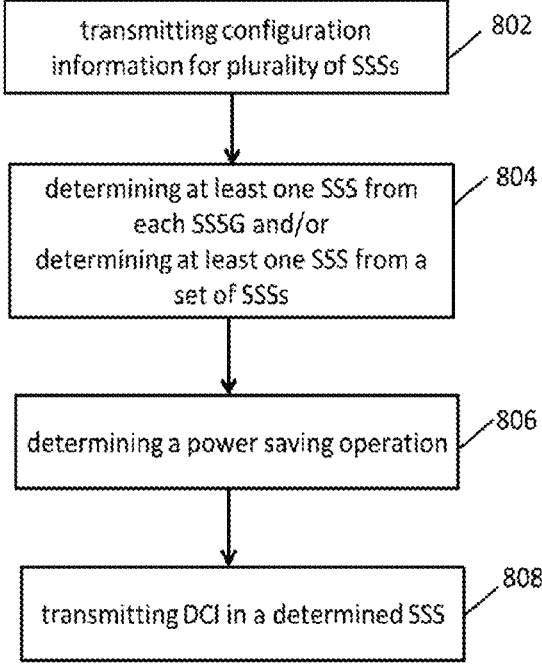
FIG. 8 is a flow chart illustrating an exemplary method for DRX according to some other embodiments of the present application.

FIG. 8 is a flow chart illustrating an exemplary procedure of a method for DRX according to some other embodiments of the present application. The method may be performed by a BS, for example, the BS 101 as shown in FIG. 1.

In the exemplary method shown in FIG. 8, in step 802, the BS may transmit configuration information for a plurality of SSSs to a UE (e.g., the UE 102 as shown in FIG. 1). In some embodiments, the configuration information may include configuration fields for each SSS, as listed in Table 1. Alternatively or additionally, for the plurality of SSSs, the BS may flexibly configure a number of SSSGs and a number of SSSs within an SSSG. For example, the configuration information may indicate whether an SSS of the plurality of SSSs is associated with one or more SSSGs. Consequently, there are three cases for the plurality of SSSs.

1) Case 1: no SSSG is configured, i.e., the plurality of SSSs are not associated with any SSSG.

2) Case 2: at least one SSSG is configured, and the plurality of SSSs may include one or more SSSs associated with the at least one SSSG and a set of SSSs outside any SSSG.

3) Case 3: at least one SSSG is configured, and the plurality of SSSs are all associated with the at least one SSSG and do not include SSS outside any SSSG.

For the plurality of SSSs, in step 804, the BS may determine at least one SSS from each SSSG and/or determine at least one SSS from a set of SSSs outside any SSSG, which may be used for power saving indication (i.e., used by the BS to transmit DCI indicating a power saving operation such as the PDCCH skipping scheme or the SSSG switching scheme). That is, in step 804, in the case that one or more SSSs of the plurality of SSSs are associated with at least one SSSG (i.e., case 2 or case 3), the BS may determine at least one SSS from each SSSG. In the case that the plurality of SSSs include a set of SSSs (including one or more SSSs) outside any SSSG (i.e., case 1 or case 2), the BS may determine at least one SSS from the set of SSSs.

In some embodiments, determining the at least one SSS from each SSSG (e.g., in case 2 or case 3) may include determining an SSS with a highest priority in the SSSG. Determining the at least one SSS from the set of SSSs outside any SSSG (e.g., in case 1 or case 2) may include determining an SSS with a highest priority in the set of SSSs. In these embodiments, the BS may use the same rule as that used by the UE in the embodiments described with respect to FIG. 5 to determine the at least one SSS and perform the same operations to determine the at least one SSS as those performed by the UE in the embodiments described with respect to FIG. 5. In some other embodiments, the BS may determine the at least one SSS according to other rules instead of based on priorities of SSSs.

In some other embodiments, the BS may first determine the at least one SSS from each SSSG and/or determine the at least one SSS from the set of SSSs outside any SSSG, and then transmit a configuration to indicate the determined at least one SSS to the UE. That is, the BS may transmit a configuration to indicate the at least one SSS determined from each SSSG to the UE (e.g., in case 2 or case 3). Alternatively or additionally, the BS may transmit a configuration to indicate the at least one SSS determined from the set of SSSs outside any SSSG (e.g., in case 1 or case 2). The configuration may be included in the configuration information transmitted in step 802 or may be separate from the configuration information transmitted in step 802.

In an embodiment of the present application, the configuration may indicate at least one SSS separately for each SSSG. That is, for each SSSG, the configuration may explicitly indicate at least one SSS which may be used for power saving indication from the SSSG.

In another embodiment of the present application, the configuration may indicate an SSS for a specific SSSG, e.g., a first SSS for a first SSSG, such that the UE may determine at least one SSS which may be used for power saving indication from other SSSG(s) based on the indicated SSS. The terms "first SSS" and "first SSSG" are used to distinguish the SSS and the specific SSSG indicated by the BS from other SSS(s) and SSSG(s), but are not used to limit the orders of the SSS and the specific SSSG indicated by the BS among the configured SSSs and SSSGs. In some embodiments of the present application, the first SSSG may be a default SSSG.

In this embodiment, the BS may also determine a second SSS from a second SSSG, wherein the first SSS and the second SSS may have at least one common property. In some embodiments, the common property may include the same DCI format, the same CORESET, or the like.

For example, the second SSS may have the same DCI format and is associated with the same CORESET as the first SSS. Similarly, the terms "second SSS" and "second SSSG" are not used to limit the orders of the SSS and SSSG determined by the BS. The BS may determine at least one SSS from other SSSG(s) in the same way.

After determining the at least one SSS from each SSSG (e.g., in case 2 or case 3) and/or determining the at least one SSS from the set of SSSs outside of any SSSG (e.g., in case 1 or case 2), in step 806, the BS may determine a power saving operation for PDCCH monitoring. In some embodiments, the power saving operation for PDCCH monitoring may include a PDCCH skipping scheme or an SSSG switching scheme.

After determining the power saving mode, in step 808, the BS may transmit DCI in an SSS determined in step 804. The DCI may include a field indicating a power saving operation for PDCCH monitoring. Depending on whether the power saving mode is the PDCCH skipping scheme or the SSSG switching scheme, the BS may transmit the DCI in different SSS.

In some embodiments, in the case that the BS determines a PDCCH skipping scheme, the BS may transmit the DCI in an SSS determined from the set of SSSs outside of any SSSG, and the DCI may include the field for indicating the PDCCH skipping scheme. In the case that the BS determines an SSSG switching scheme, the BS may transmit the DCI in an SSS determined from an SSSG, and the DCI may include the field for indicating the SSSG switching scheme.

In some embodiments, the BS may transmit a configuration to indicate whether the DCI transmitted in the determined SSS indicates the PDCCH skipping scheme or the SSSG switching scheme. The configuration may be included in the configuration information transmitted in step 802 or may be separate from the configuration information transmitted in step 802.

In some embodiments, in the case that the field indicates the PDCCH skipping scheme, a number of bits in the field may be determined by a number of candidate PDCCH skipping durations.

In some embodiments, in the case that the field indicates the SSSG switching scheme, a number of bits in the field may be determined by a number of the at least one SSSG configured by the BS.

In some embodiments, a number of bits in the field may be a higher one of a first number of bits determined based on a number of candidate PDCCH skipping durations and a second number of bits determined based on a number of the at least one SSSG configured by the BS.

In some embodiments, two SSSGs in the at least one SSSG configured by the BS may be activated simultaneously. In such cases, when the BS determines a PDCCH skipping scheme, the BS may transmit the DCI in an SSS determined from one SSSG of the two SSSGs, and the field in the DCI may indicate the PDCCH skipping scheme; when the BS determines an SSSG switching scheme, the BS may transmit the DCI in an SSS determined from the other SSSG of the two SSSGs, and the field in the DCI may indicate the SSSG switching scheme. In these embodiments, the number of bits in the field of DCI may be determined based on the same rule as the above embodiments. In an embodiment, the one SSSG for indicating the PDCCH skipping scheme may be a default SSSG.

Figure 9:
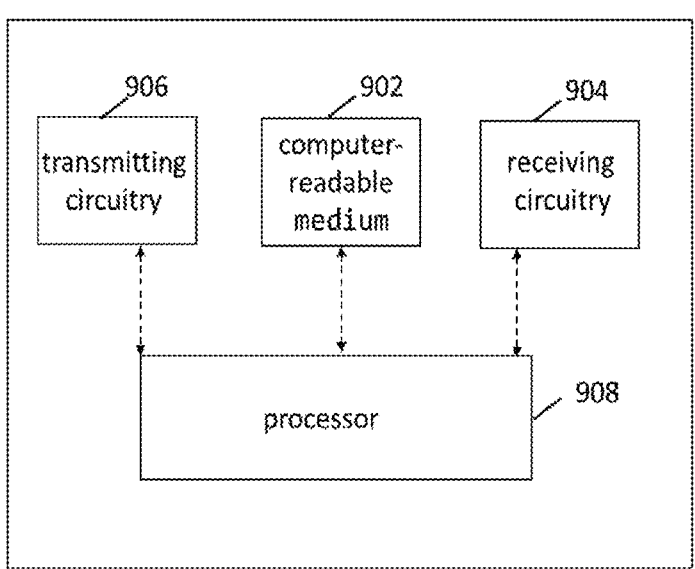
FIG. 9 illustrates a simplified block diagram of an exemplary apparatus for DRX according to some embodiments of the present application.

FIG. 9 illustrates a simplified block diagram of an exemplary apparatus for DRX according to some embodiments of the present application. The apparatus 900 may include a UE or a BS as shown in FIG. 1.

Referring to FIG. 9, the apparatus 900 may include at least one non-transitory computer-readable medium 902, at least one receiving circuitry 904, at least one transmitting circuitry 906, and at least one processor 908. In some embodiments of the present application, the at least one receiving circuitry 904 and the at least one transmitting circuitry 906 can be integrated into at least one transceiver. The at least one non-transitory computer-readable medium 902 may have computer executable instructions stored therein. The at least one processor 908 may be coupled to the at least one non-transitory computer-readable medium 902, the at least one receiving circuitry 904 and the at least one transmitting circuitry 906. While shown to be coupled to each other via the at least one processor 908 in the example of FIG. 9, the at least one receiving circuitry 904, the at least one transmitting circuitry 906, the at least one non-transitory computer-readable medium 902, and the at least one processor 908 may be coupled to one another in various arrangements. For example, the at least one receiving circuitry 904, the at least one transmitting circuitry 906, the at least one non-transitory computer-readable medium 902, and the at least one processor 908 may be coupled to each other via one or more local buses (not shown for simplicity). The computer executable instructions stored on the at least one non-transitory computer-readable medium 902 can be programmed to implement a method with the at least one receiving circuitry 904, the at least one transmitting circuitry 906 and the at least one processor 908. The method may include the operations or steps as shown in FIG. 5 or 8.

The method according to embodiments of the present application can also be implemented on a programmed processor. However, the controllers, flowcharts, and modules may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device on which resides a finite state machine capable of implementing the flowcharts shown in the figures may be used to implement the processor functions of this application. For example, an embodiment of the present application provides an apparatus for DRX, including a processor and a memory. Computer programmable instructions for implementing a method for DRX are stored in the memory, and the processor is configured to perform the computer programmable instructions to implement the method for DRX. The method may be a method as stated above or other method according to an embodiment of the present application.

An alternative embodiment preferably implements the methods according to embodiments of the present application in a non-transitory, computer-readable storage medium storing computer programmable instructions. The instructions are preferably executed by computer-executable components preferably integrated with a network security system. The non-transitory, computer-readable storage medium may be stored on any suitable computer readable media such as RAMs, ROMs, flash memory, EEPROMs, optical storage devices (CD or DVD), hard drives, floppy drives, or any suitable device. The computer-executable component is preferably a processor but the instructions may alternatively or additionally be executed by any suitable dedicated hardware device. For example, an embodiment of the present application provides a non-transitory, computer-readable storage medium having computer programmable instructions stored therein. The computer programmable instructions are configured to implement a method for DRX as stated above or other method according to an embodiment of the present application.

While this application has been described with specific embodiments thereof, it is evident that many alternatives, modifications, and variations may be apparent to those skilled in the art. For example, various components of the embodiments may be interchanged, added, or substituted in the other embodiments. Also, all of the elements of each figure are not necessary for operation of the disclosed embodiments. For example, one of ordinary skills in the art would be enabled to make and use the teachings of the application by simply employing the elements of the independent claims. Accordingly, embodiments of the application as set forth herein are intended to be illustrative, not limiting. Various changes may be made without departing from the spirit and scope of the application.

What is claimed is:
1. A method, comprising:
   receiving configuration information for search space sets (SSSs);

when one or more of the SSSs are associated with at least one SSS group (SSSG), then determining at least one SSS from each SSSG;

when the SSSs include a set of the SSSs outside any SSSG, then determining the at least one SSS from the set of the SSSs; and detecting downlink control information (DCI) in the at least one SSS, the DCI including a field indicating a power saving operation for physical downlink control channel (PDCCH) monitoring, the DCI detected in the at least one SSS determined from the set of the SSSs comprising a field that indicates a PDCCH skipping scheme, wherein the PDCCH monitoring is skipped when no data traffic arrives.

2. The method of claim 1, wherein at least one of:

determining the at least one SSS from each SSSG includes determining the at least one SSS with a highest priority in the SSSG; or determining the at least one SSS from the set of the SSSs includes determining the at least one SSS with the highest priority in the set of the SSSs.

3. The method of claim 2, wherein a priority of each SSS is determined based on a DCI format associated with the SSS.

4. The method of claim 2, wherein at least one of:

a user equipment (UE) specific search space set (USS) with a lower index in an SSSG has a higher priority than a USS with a higher index in the SSSG; or the USS with the lower index in the set of the SSSs has the higher priority than the USS with the higher index in the set of the SSSs.

5. The method of claim 2, wherein at least one of:

a user equipment (UE) specific search space set (USS) in an SSSG has a higher priority than a common search space set (CSS) in the SSSG; or a USS in the set of the SSSs has the higher priority than the CSS in the set of the SSSs.

6. The method of claim 1, wherein at least one of:

the at least one SSS is determined from each SSSG based at least in part on a configuration received from a base station; or the at least one SSS is determined from the set of the SSSs based at least in part on the configuration received from the base station.

7. The method of claim 6, wherein the configuration indicates at least one separate SSS for each SSSG.

8. The method of claim 1, wherein the power saving operation for the PDCCH monitoring comprises the PDCCH skipping scheme or an SSSG switching scheme.

9. The method of claim 8, wherein the DCI detected in the at least one SSS determined from an SSSG comprises a field for indicating the SSSG switching scheme.

10. The method of claim 8, wherein the DCI detected in the determined at least one SSS is configured by a base station (BS) to indicate the PDCCH skipping scheme or the SSSG switching scheme.

11. The method of claim 1, further comprising:

detecting a common search space set (CSS) in a PDCCH monitoring occasion during PDCCH skipping, the CSS including at least one of a type-0 CSS for scheduling system information, a type-1 CSS for data scheduling in a random access procedure, or a type-2 CSS for paging scheduling.

12. A base station for wireless communication, comprising:

at least one memory; and at least one processor coupled with the at least one memory and configured to cause the base station to:

transmit configuration information for search space sets (SSSs);

when one or more of the SSSs are associated with at least one SSS group (SSSG), then determine at least one SSS from each SSSG;

when the SSSs include a set of the SSSs outside any SSSG, then determine the at least one SSS from the set of the SSSs;

determine a power saving operation for physical downlink control channel (PDCCH) monitoring; and transmit downlink control information (DCI) in the at least one SSS, the DCI including a first field indicating the power saving operation for the PDCCH monitoring, and a second field indicating a PDCCH skipping scheme, wherein the PDCCH monitoring is skipped when no data traffic arrives.

13. The base station of claim 12, wherein at least one of:

the at least one SSS is determined from each SSSG as the at least one SSS with a highest priority in the SSSG; or the at least one SSS is determined from the set of the SSSs as the at least one SSS with the highest priority in the set of the SSSs.

14. A user equipment (UE) for wireless communication, comprising:

at least one memory; and at least one processor coupled with the at least one memory and configured to cause the UE to:

receive configuration information for search space sets (SSSs);

when one or more of the SSSs are associated with at least one SSS group (SSSG), then determine at least one SSS from each SSSG;

when the SSSs include a set of the SSSs outside any SSSG, then determine the at least one SSS from the set of the SSSs; and detect downlink control information (DCI) in the at least one SSS, the DCI including a field indicating a power saving operation for physical downlink control channel (PDCCH) monitoring, the DCI detected in the at least one SSS determined from the set of the SSSs comprising a field that indicates a PDCCH skipping scheme, wherein the PDCCH monitoring is skipped when no data traffic arrives.

15. The UE of claim 14, wherein at least one of:

the at least one SSS is determined from each SSSG as the at least one SSS with a highest priority in the SSSG; or the at least one SSS is determined from the set of the SSSs as the at least one SSS with the highest priority in the set of the SSSs.

16. The UE of claim 15, wherein a priority of each SSS is determined based on a DCI format associated with the SSS.

17. The UE of claim 14, wherein the power saving operation for the PDCCH monitoring comprises the PDCCH skipping scheme or an SSSG switching scheme.

18. The UE of claim 14, wherein the at least one processor is configured to cause the UE to detect a common search space set (CSS) in a PDCCH monitoring occasion during PDCCH skipping, the CSS including at least one of a type-0 CSS for scheduling system information, a type-1 CSS for data scheduling in a random access procedure, or a type-2 CSS for paging scheduling.

19. A processor for wireless communication, comprising:

at least one controller coupled with at least one memory and configured to cause the processor to:

receive configuration information for search space sets (SSSs);

when one or more of the SSSs are associated with at least one SSS group (SSSG), then determine at least one SSS from each SSSG;

when the SSSs include a set of the SSSs outside any SSSG, then determine the at least one SSS from the set of the SSSs; and detect downlink control information (DCI) in the at least one SSS, the DCI including a field indicating a power saving operation for physical downlink control channel (PDCCH) monitoring, the DCI detected in the at least one SSS determined from the set of the SSSs comprising a field that indicates a PDCCH skipping scheme, wherein the PDCCH monitoring is skipped when no data traffic arrives.

20. The processor of claim 19, further comprising:

detecting a common search space set (CSS) in a PDCCH monitoring occasion during PDCCH skipping, the CSS including at least one of a type-0 CSS for scheduling system information, a type-1 CSS for data scheduling in a random access procedure, or a type-2 CSS for paging scheduling.

\* \* \* \* \*